May 2, 1933. H. A. VETCH 1,906,438
APPARATUS FOR PREPARING ARTICHOKES FOR CANNING
Filed Aug. 9, 1930 3 Sheets-Sheet 1
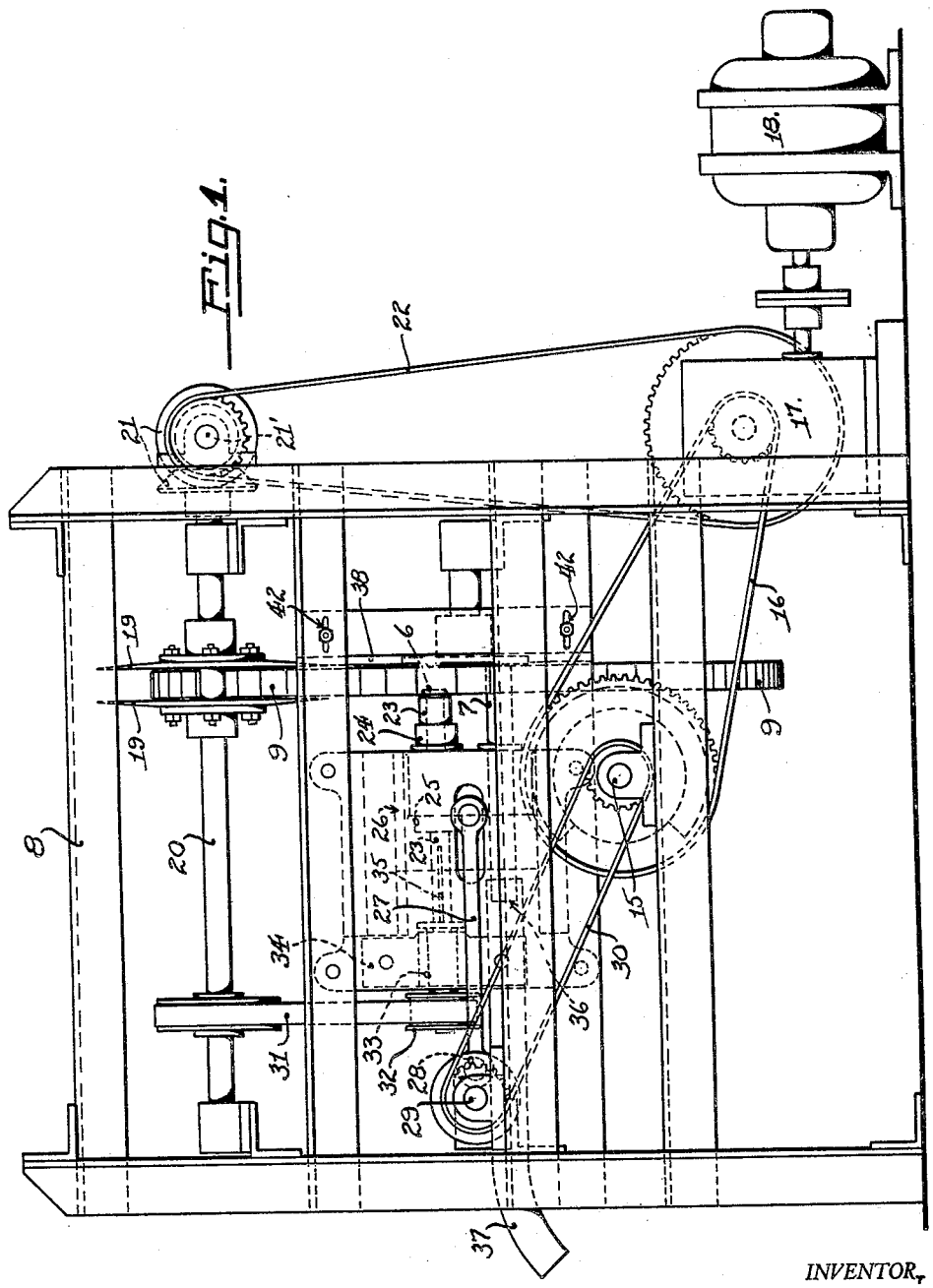
INVENTOR,
Hamilton A. Vetch
BY Booth & Booth
ATTORNEYS.

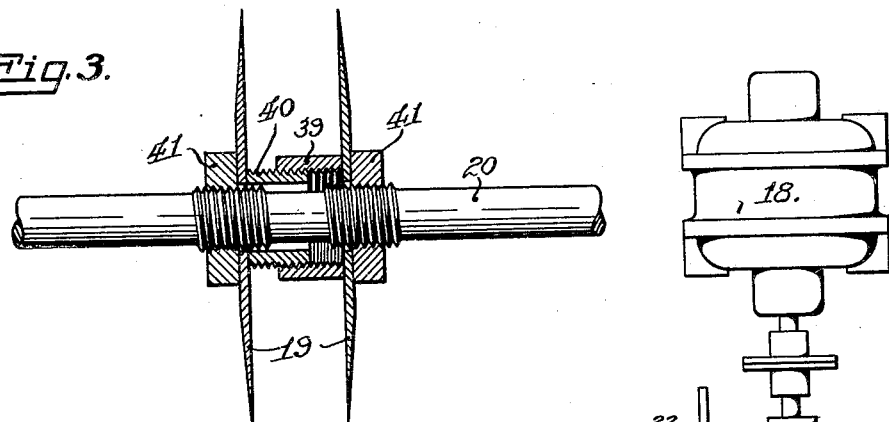
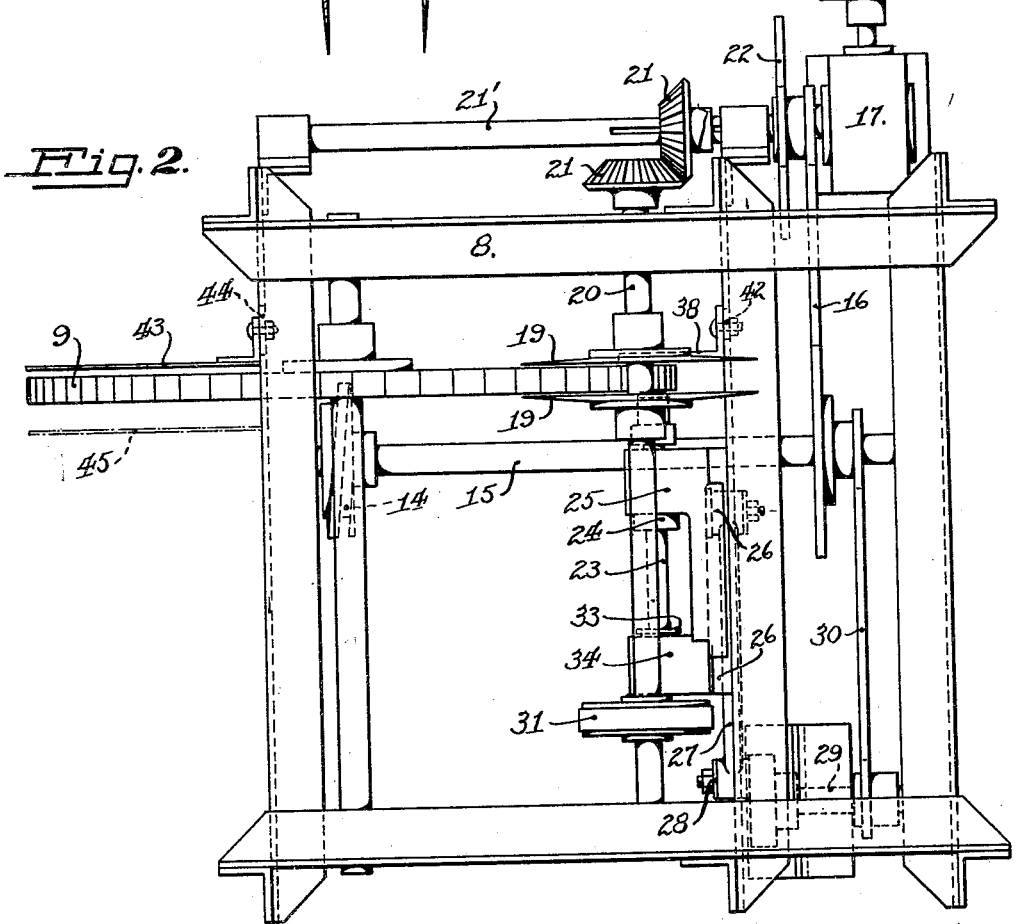

INVENTOR,
Hamilton A. Vetch
BY Booth & Booth
ATTORNEYS.

Patented May 2, 1933

1,906,438

UNITED STATES PATENT OFFICE

HAMILTON A. VETCH, OF SAN JOSE, CALIFORNIA, ASSIGNOR TO PRATT-LOW PRESERVING COMPANY, OF SANTA CLARA, CALIFORNIA, A CORPORATION OF CALIFORNIA

APPARATUS FOR PREPARING ARTICHOKES FOR CANNING

Application filed August 9, 1930. Serial No. 474,259.

The present invention relates to the art of preparing artichokes for canning, and more particularly to the removal of the heart or soft interior portion of the artichoke from its hull or woody outer leaves.

The principal object of the invention is to provide an apparatus by which the heart of the artichoke can be separated from the hull quickly and in a clean and accurate manner by successive operations performed by a single machine. A second object is to provide an automatic machine capable of rapid operation upon a continuous procession of artichokes. A third object is to provide a machine which is adjustable to accommodate artichokes of various sizes.

The above and other objects and advantages of the invention will become apparent from the following specification which should be read with the understanding that the form, construction and arrangement of the several parts may be varied within the limits of the claims hereto appended, without departing from the spirit of the invention.

A preferred form of apparatus embodying the principles of the invention is illustrated in the accompanying drawings wherein Fig. 1 is an end elevation of the machine.

Fig. 2 is a plan view thereof.

Fig. 3 is a section, enlarged, of the trimming knives.

In preparing artichokes for canning, it is common practise to strip off the outer woody leaves, by hand, leaving the soft interior or heart, which is the part to be preserved. The ends of this heart are then cut or trimmed off, transversely.

My invention consists, essentially, in a machine or apparatus for reversing the above process, i. e. holding the artichoke by means embracing and grasping its outer leaves, cutting off its ends, and removing the heart from within said outer leaves, leaving the latter as a hull still embraced by the holding means. Owing to the nature of the article to be operated upon, there are certain novel features both of structure and of method, the former of which are herein claimed, while the method though necessarily herein appearing for a full understanding of the machine, is relegated to and forms the subject matter of a separate application Serial No. 528,005, filed April 6, 1931, which is a division hereof.

Figure 7:
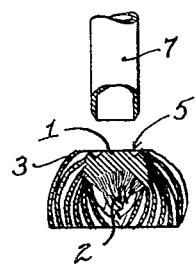
Fig. 7 is a similar section of the trimmed and grooved artichoke showing the relation of the punch thereto.
Figure 5:
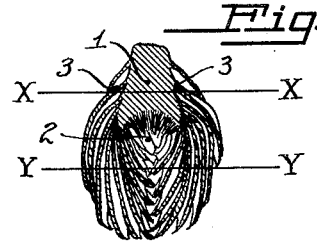
Fig. 5 is a longitudinal central section of an artichoke before being operated upon.

In Fig. 5 of the drawings, I have shown a longitudinal section of an artichoke, 1 being the stem, 2 the heart, and 3 the outermost leaves. X—X and Y—Y represent transverse planes in which the ends are trimmed off. After the stem end is trimmed on the plane X—X, the heart 2, with base portion of the stem 1 adhering thereto, is removed from within the outer leaves. Any suitable means may be used for removing said heart, which in its simplest and preferred form comprises a tubular punch 7, Fig. 7, movable longitudinally through the artichoke, the heart 2 retreating into the interior of said punch, and the hull or outer leaves 3 remaining intact.

It will be seen from Fig. 5 that the maximum diameter of the stem 1 occurs between the planes X—X and Y—Y, and that the bases of the outermost woody leaves 3 join said stem where its diameter is less than the maximum. In order to prevent waste, and to take out the entire usable portion of the heart, the heart-removing means should pass through the artichoke along a cylindrical plane whose diameter is at least equal to the maximum diameter of the stem, but in so doing it must pass through the fibrous bases of said outermost leaves.

Although it may be possible to provide a single cutting or punching means which will cut through said fibrous bases of the outermost leaves and then continue on through the artichoke to remove the heart therefrom, I have found that a cleaner and less wasteful product can be obtained by performing these operations in two successive steps with two separate instrumentalities. The first of these two operations is the separation of the fibrous bases of the outermost leaves 3 from the stem, and the preferred method of so doing is to cut an annular groove in the trimmed stem end of the artichoke, as shown at 5 in Fig. 6, thereby cutting through the woody fibers of the bases of said outermost leaves 3 at the points where they are attached to the stem or base 1 of the heart, so that the subsequently entering heart removing means or punch will encounter only the soft structure of the heart 2. The groove also removes the bases of said outermost leaves 3 from the stem or heart so that no fibrous portions remain adhering thereto. By thus grooving the trimmed stem end or base of the heart, it is possible to punch said heart out longitudinally, to its full diameter, without having any of the fibrous outer leaves interfering with the action of the punch. The result is a cleanly punched out heart of maximum diameter, having no fibrous or woody portions attached thereto.

Figure 6:
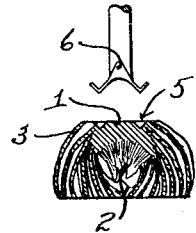
Fig. 6 is a similar section of the artichoke after being trimmed and grooved, showing the grooving knife.

The formation of the groove 5 is preferably made by a rapidly rotating knife of the character indicated at 6 in Fig. 6, having two opposite V-shaped blades. The heart is removed by any suitable means preferably the tubular punch 7, Fig. 7, as before stated. The entire process consists in first trimming or cutting off, transversely, the two ends of the artichoke approximately along the lines X—X and Y—Y of Fig. 6, then forming the annular groove 5 in the trimmed base 1 of the heart 2 by means of the rapidly rotating knife 6, and finally removing the heart longitudinally by means of the tubular punch 7, Fig. 7, which enters the groove 5 as a starting point.

Figure 4:
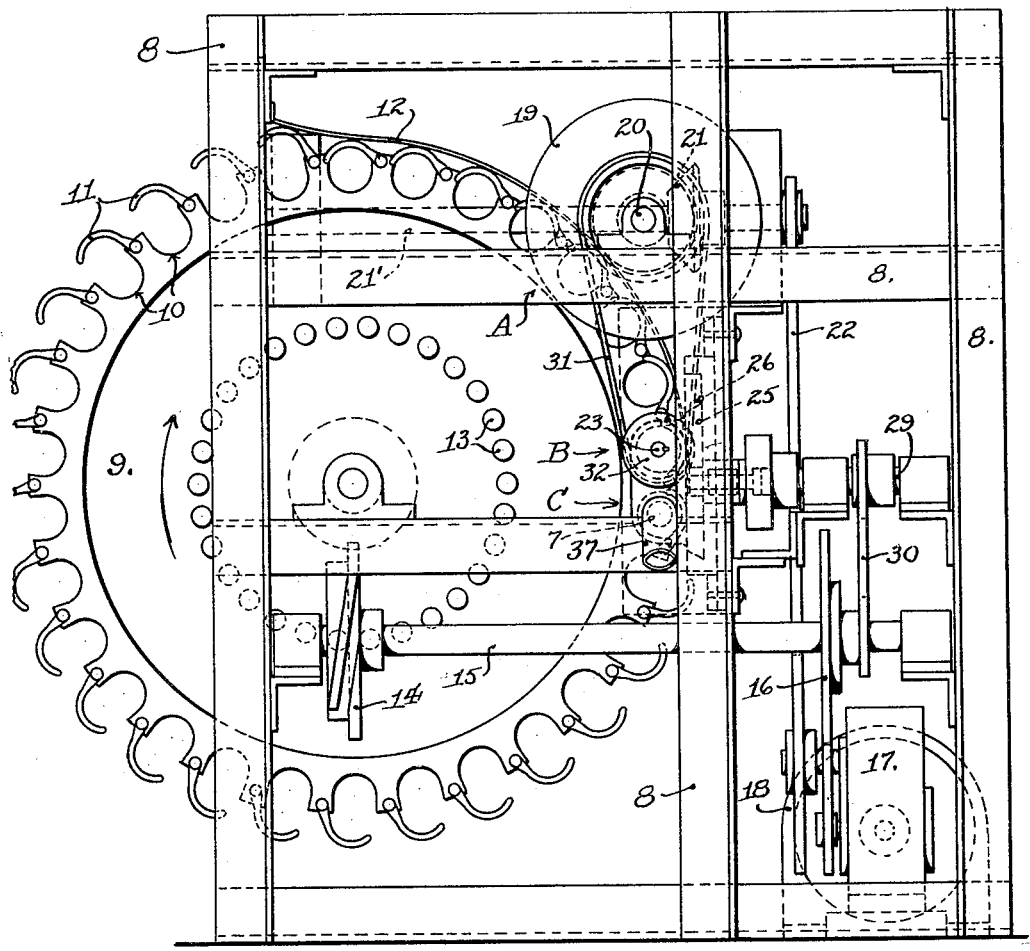
Fig. 4 is a side elevation viewed from the left of Fig. 1.

The preferred mechanism by which the above described process is carried out comprises a frame 8, Figs. 1, 2 and 4, in which is mounted a revolving turret 9 adapted to receive and hold a succession of artichokes and to present them to the trimming, grooving, and punching instrumentalities in succession. Any suitable form of holding devices can be used upon the turret 9. As an example, I have shown a plurality of pockets 10 formed in the periphery of said turret, and each pocket is provided with a swinging cover 11, said covers being shown clearly in Fig. 4, but omitted from the other views to avoid confusion. The artichokes are placed in the pockets, manually or by any suitable means, not shown in the drawings, and are held therein by the covers 11. A fixed rail 12, shown only in Fig. 4, causes said covers 11 to close upon their respective pockets and to clamp the artichokes firmly therein. The width of the turret 9, as shown in Figs. 1 and 2, is such as to permit the end portions of the artichokes to project laterally therefrom so that they may be trimmed off while the central portion is held within the pockets 10.

The turret 9 is rotated intermittently by any suitable mechanism. In the drawings, I have shown a plurality of studs 13, Fig. 4, projecting from one face of the turret and corresponding in number to the pockets 10. These studs are engaged by an approximately helical cam 14 mounted upon a continuously rotating shaft 15. The cam 14 is so formed as to advance the turret the distance of one end stud or pocket and then to hold it at rest for an appreciable time before the next step movement takes place. This form of mechanism being well known, it is unnecessary to further describe the exact shape of the cam 14. The shaft 15 is driven continuously by a chain, indicated at 16, and a speed reducing gear mechanism 17, from a motor 18. The interior construction of the speed reducing mechanism 17 is not shown in the drawings, such mechanisms being common articles of manufacture.

The first operation performed upon the artichokes held within the pockets 10 of the turret 9, is the trimming of their ends, as described above. This is preferably accomplished at the position A, Fig. 4, by a pair of spaced circular knives or saws 19 rotating at high speed, and straddling the peripheral portion of the turret 9. The trimming knives 19 are mounted upon a shaft 20, Figs. 1, 2 and 4, which is continuously driven by bevel gears 21, a shaft 21', and a chain indicated at 22 from the drive mechanism 17.

After its ends have been trimmed or cut off by the rotating knives 19, the artichoke, still clamped within the pocket of the turret 9, is carried by successive step movements of said turret to the position B of Fig. 4, where it is axially aligned with the V-shaped rotating grooving knife 6 illustrated in Fig. 6. This knife is mounted upon a shaft 23, Figs. 1 and 2, which has a bearing 24 in slidable carriage 25. The carriage 25 is mounted in suitable guides 26, and is reciprocated by a link 27 connecting it with a crank 28 upon a short shaft 29 at the rear of the machine, said shaft being continuously driven by a chain 30 from the shaft 15. The grooving knife 6 thus has a reciprocating motion which carries it into and out of engagement with the trimmed stem end of the artichoke held within the pocket of the turret 9 at the position B. The grooving knife 6 is also rotated continuously and at high speed by means of a belt 31, Fig. 1, from the trimming knife shaft 20. The belt 31 drives a pulley 32 secured upon a sleeve 33 journaled in a bracket 34 secured to or forming a part of the carriage guide 26. The grooving knife shaft 23 extends through the pulley sleeve 33, and is splined thereto as indicated at 35. Thus said grooving knife shaft 23 is rotated by the sleeve 33, but is free to slide therein to permit it to have reciprocating movement.

The next step movement of the turret 9 carries the artichoke to the position C, Fig. 4, where it is axially aligned with the heart removing means or tubular punch 7, which is also carried in the reciprocating carriage 25, as indicated in Fig. 1. When said carriage moves toward the turret 9, the punch 7 first enters the previously cut annular groove 5 in the trimmed stem end of the artichoke, and then continues on through said artichoke, severing the heart from the hull. The heart passes into the interior of the punch 7, is subsequently forced out from the rear end 36 thereof by the successively following hearts, and is discharged from the machine through a suitably disposed tube 37. The end 36 of the punch 7 reciprocates freely within said discharge tube. A fixed plate 38, Fig. 1, is positioned beside the peripheral pocket region of the turret 9 at the positions B and C to prevent the artichoke from being pushed out of its pocket by the thrust of the grooving knife 6 and the punch 7. The continued step movement of the turret 9 causes the covers 11 of the pockets 10 to pass beyond the lower end of the holding rail 12, allowing them to open and permit the discharge of the hull of the artichoke.

Adjustment of the machine to accommodate artichokes of various sizes is provided. The principal adjustment is in the spacing of the trimming knives 19 to permit variation in the length of the final product. A preferred means for adjusting said trimming knives is shown in Fig. 3, and comprises a spacing sleeve between said knives formed of two threaded portions 39 and 40. The knife disks 19 are clamped against the ends of said spacer by nuts 41 screwed upon the shaft 20. Thus in order to adjust the spacing of the knives 19 it is merely necessary to loosen the nuts 41 and change the length of the spacer by screwing its parts 39 and 40 upon or away from each other.

A turret of one width will accommodate considerable variation in the length of the artichokes, since it is not essential that the trimming knives 19 operate close to the sides of said turret. However, if extreme variations in length are encountered or if artichokes of different diameters are to be handled, the entire turret 9 is removed and replaced by another of suitable dimensions. The plate 38 which backs the artichokes against the thrust of the grooving knife 6 and the punch 7, is adjustable toward or away from the turret 9, as indicated at 42 in Fig. 1. If artichokes having hearts of different diameters are to be operated upon, the grooving knife 6 and the punch 7 are removed and replaced by others of suitable diameter.

I have shown, in Fig. 2 only, a positioning plate or guide 43 extending from the frame 8 beside the turret 9 at the feed side thereof. This plate, which can be adjusted toward or away from the turret, as indicated at 44, serves as a guide to locate the artichokes endwise within the pockets 10. If desired, a similar guide plate may be employed on the opposite side of the turret, as indicated at 45.

In the operation of the machine, the artichokes are placed within the pockets 10 of the turret 9, with their blossom ends against the guide plate 43, and are clamped within said pockets by the covers 11 riding within the fixed rail 12. The step rotation of the turret 9 carries the artichokes first to the position A, where their ends are trimmed off, as indicated by the lines X—X and Y—Y in Fig. 5, by the operation of the rapidly and continuously rotating circular knives 19. Successive movements of the turret 9 carry the artichokes to the position B, at which, during a period of rest of the turret, the rapidly rotating grooving knife 6 is moved axially into contact with the trimmed stem end of the artichoke, forming the groove 5 therein. This groove separates the fibrous base portions of the outermost leaves of the artichoke from its heart, providing a free starting point for the punch. The next movement of the turret 9 carries the grooved artichoke to the position C, at which, during the subsequent period of rest of said turret, the reciprocating tubular punch 7 enters the groove 5 in said artichoke and passes entirely through it, separating the heart from the hull, the heart passing into said tubular punch and being withdrawn therewith, and the hull remaining in the still closed pocket 10 of the turret. Subsequent movement of the turret permits the opening of the pocket and the discharge therefrom of the hull. The heart within the tubular punch 7 is forced out from its rear end into the discharge tube 37 by the repeated introduction into its forward end of succeeding hearts.

Thus the machine, by successive steps, operates upon a continuous procession of artichokes, and separates the hearts from the hulls thereof in a clean manner and without waste of usable material.

I claim:—

1. An apparatus for the described purpose comprising means for holding an artichoke, means for cutting off the stem end thereof at the base of the heart, a rotating knife having a V-shaped blade for cutting an annular groove in said cut stem end at the bases of the outer leaves, and means for removing the heart from within said outer leaves.

2. An apparatus for the described purpose comprising a turret having a plurality of peripheral pockets, means for holding an artichoke in each pocket, means for separating the bases of the outer leaves from the base of the heart, other means for removing the heart from within the outer leaves, and means for moving said turret to carry the artichokes successively to and through the spheres of action of said separating and heart removing means.

3. An apparatus for the described purpose comprising a rotatable turret having a peripheral outwardly opening artichoke holding pocket, a gate for closing said pocket, a stationary member surrounding a portion of the periphery of said turret, said member being positioned to engage said gate to close it upon the artichoke in said pocket, means for removing the heart of the artichoke from within its outer leaves while held in said pocket, and means for rotating said turret to carry the artichoke to and from the sphere of action of said heart removing means.

In testimony whereof I have signed my name to this specification.

HAMILTON A. VETCH.